(12) United States Patent
Itoh (10) Patent No.: US 7,139,132 B2
(45) Date of Patent: Nov. 21, 2006

(54) ZOOM LENS SYSTEM AND IMAGE PICKUP APPARATUS HAVING THE SAME

(75) Inventor: Yoshinori Itoh, Kawachi-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 11/168,164

(22) Filed: Jun. 27, 2005

(65) Prior Publication Data

US 2006/0007560 A1    Jan. 12, 2006

(30) Foreign Application Priority Data

Jul. 9, 2004    (JP)    ............... 2004-203857

(51) Int. Cl.
  *G02B 15/14*    (2006.01)
(52) U.S. Cl. ................................ 359/691
(58) Field of Classification Search .............. 359/690, 359/691
  See application file for complete search history.

(56) References Cited

U.S. PATENT DOCUMENTS

| 5,381,268 A * | 1/1995 | Sato ............................ 359/691 |
| 5,663,836 A | 9/1997 | Ogata .......................... 359/691 |
| 5,875,060 A | 2/1999 | Umeda ......................... 359/691 |
| 6,081,389 A | 6/2000 | Takayama ..................... 359/680 |
| 6,124,987 A | 9/2000 | Kayanuma ..................... 359/692 |
| 6,172,818 B1 | 1/2001 | Sakamoto ...................... 359/689 |
| 6,243,213 B1 | 6/2001 | Mori ........................... 359/681 |
| 6,351,337 B1 | 2/2002 | Tanaka ......................... 359/684 |
| 6,982,834 B1 * | 1/2006 | Sato ............................ 359/682 |

FOREIGN PATENT DOCUMENTS

| EP | 1326119 A2 | 7/2003 |
| JP | 6-273670 A | 9/1994 |
| JP | 9-033810 A | 2/1997 |
| JP | 11-052235 A | 2/1999 |
| JP | 2000-9997 A | 1/2000 |
| JP | 2000-9999 A | 1/2000 |
| JP | 2000-147381 A | 5/2000 |
| JP | 2000-284177 A | 10/2000 |

* cited by examiner

Primary Examiner—Scott J. Sugarman
Assistant Examiner—M. Hasan
(74) Attorney, Agent, or Firm—Canon USA, Inc. Intellectual Property Division (57) ABSTRACT

A zoom lens system including, from the object side to the image side, a first lens unit and a second lens unit, where when zooming, the distance between the first lens unit and the second lens unit changes. In at least one exemplary embodiment, the first lens unit includes a first lens element having negative optical power, and a second lens element having positive optical power.

20 Claims, 11 Drawing Sheets

ZOOM LENS SYSTEM AND IMAGE PICKUP APPARATUS HAVING THE SAME

BACKGROUND OF THE INVENTION

1. Field of the Invention

The present invention relates to a zoom lens system. More particularly, but not exclusively, the present invention relates to a zoom lens system suitable as an optical system for an image pickup apparatus.

2. Description of the Related Art

Recently, the technology of solid-state image sensors, such as a CCD, used in image pickup apparatuses, such as digital still cameras and camcorders, has made remarkable progress. In addition, the image pickup apparatuses have been reduced in size. Therefore, a compact, thin, and lightweight photographic lens system having improved optical performance is needed.

A two-unit zoom lens has relatively improved optical performance, and its entire lens system is small. The two-unit zoom lens includes, from the object side to the image side, a first lens unit having negative refractive power and a second lens unit having positive refractive power, and changes the distance (air space) between the two lens units to perform zooming.

The lens system of this two-unit zoom lens is composed of a relatively small number of lenses. Therefore, this two-unit zoom lens is commonly used in small lens systems.

A small two-unit zoom lens whose first lens unit consists of a negative lens and a positive lens and whose second lens unit consists of a positive lens and a negative lens is discussed in Japanese Patent Laid-Open No. 6-273670, Japanese Patent Laid-Open No. 9-033810, and Japanese Patent Laid-Open No. 11-052235 (corresponding to U.S. Pat. No. 6,081,389).

A two-unit zoom lens whose second lens unit consists of a first lens subunit having positive refractive power and a second lens subunit having positive refractive power, the second lens subunit performing focusing, is discussed in Japanese Patent Laid-Open No. 2000-9997 (corresponding to U.S. Pat. No. 6,124,987).

A three-unit zoom lens suitable for a small image pickup apparatus having a high-resolution image sensor, the zoom lens including three lens units having negative, positive, and positive refractive power respectively, is discussed in Japanese Patent Laid-Open No. 2000-147381 (corresponding to U.S. Pat. No. 6,243,213) and Japanese Patent Laid-Open No. 2000-284177 (corresponding to U.S. Pat. No. 6,351,337).

A small three-unit zoom lens whose second lens unit consists of a positive lens and a negative lens is discussed in Japanese Patent Laid-Open No. 2000-9999 (corresponding to U.S. Pat. No. 6,172,818).

The two-unit zoom lenses and the three-unit zoom lenses discussed in the above documents can be improved in optical performance in order to be used for an image pickup apparatus using a high-resolution solid-state image sensor.

SUMMARY OF THE INVENTION

At least one exemplary embodiment is directed to a zoom lens system that is configured to be operatively connected to an image pickup apparatus (e.g., one using a solid-state image sensor), compact, and has excellent optical performance.

An exemplary embodiment includes, from the object side to the image side, a first lens unit having negative optical power and a second lens unit having positive optical power. The distance between the two lens units can change during zooming. The first lens unit can include a first lens element having negative optical power and a second lens element having positive optical power. In such a zoom lens system, the optical power of the two lens elements constituting the first lens unit and the material constituting the lens elements are set appropriately as described below.

Further features of the present invention will become apparent from the following description of exemplary embodiments (with reference to the attached drawings).

DESCRIPTION OF THE EMBODIMENTS

The following description of exemplary embodiment(s) is merely illustrative in nature and is in no way intended to limit the invention, its application, its equivalents, or uses.

Processes, techniques, apparatus, and materials as known by one of ordinary skill in the art may not be discussed in detail but are intended to be part of the enabling description where appropriate. For example lens and lens units are discussed and any material or method that can be used to form lenses should fall within the scope of exemplary embodiments (e.g., glass, Si, or etching, molding). Additionally the actual size of the lens may not be discussed however any size from macro lenses to micro and nano lenses are intended to lie within the scope of exemplary embodiments (e.g., lenses with diameters of nanometer size, micro size, centimeter, and meter sizes).

Additionally exemplary embodiments are not limited to visual optical systems, for example the system can be designed for use with infrared and other wavelength systems. For example an infrared image pickup apparatus (e.g., a detector measuring infrared markings).

Exemplary embodiments can be used on various image pickup apparatus (e.g., solid-state image sensor, for example, a camcorder, a surveillance camera, equivalents, and other image pickup apparatus as known by one of ordinary skill in the relevant art) and are not limited to digital still cameras.

Zoom lens systems and image pickup apparatus incorporating zoom lens systems, according to at least a few exemplary embodiments, will now be described.

Figure 1A:
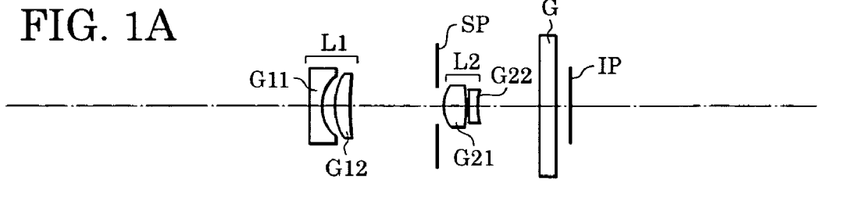
FIGS. 1A, 1B, and 1C illustrate lens sectional views of a zoom lens of exemplary embodiment 1.
Figure 1B:
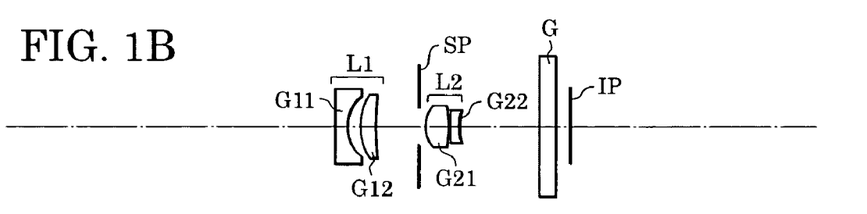
Figure 1C:
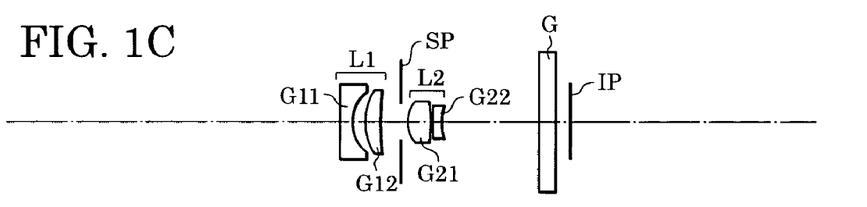
Figure 2:
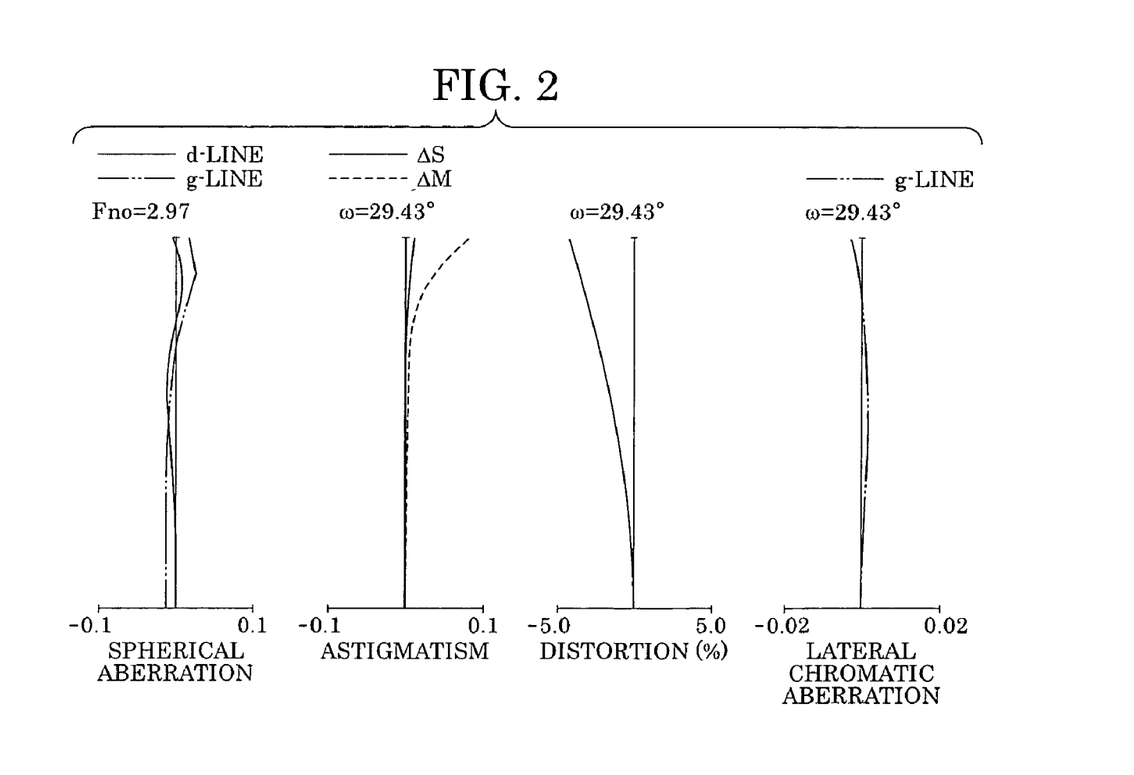
FIG. 2 illustrates an aberration diagram of the zoom lens of exemplary embodiment 1 at the wide-angle end.
Figure 3:
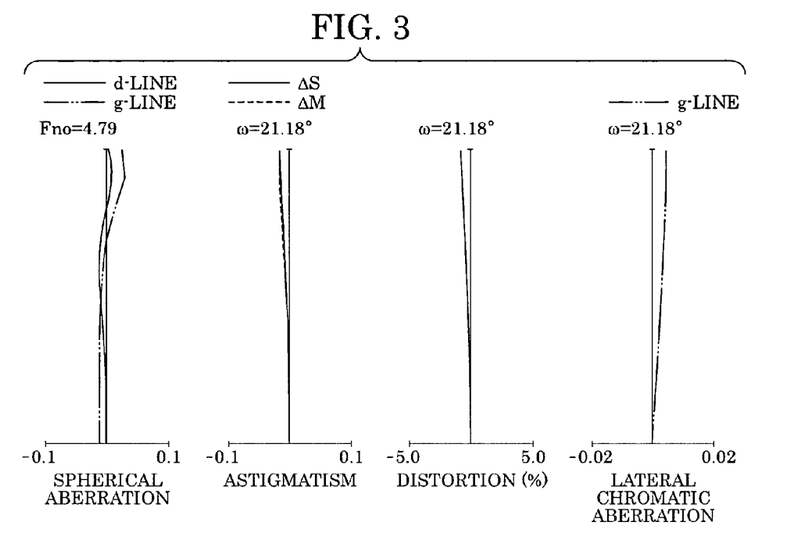
FIG. 3 illustrates an aberration diagram of the zoom lens of exemplary embodiment 1 at the middle focal length.
Figure 4:
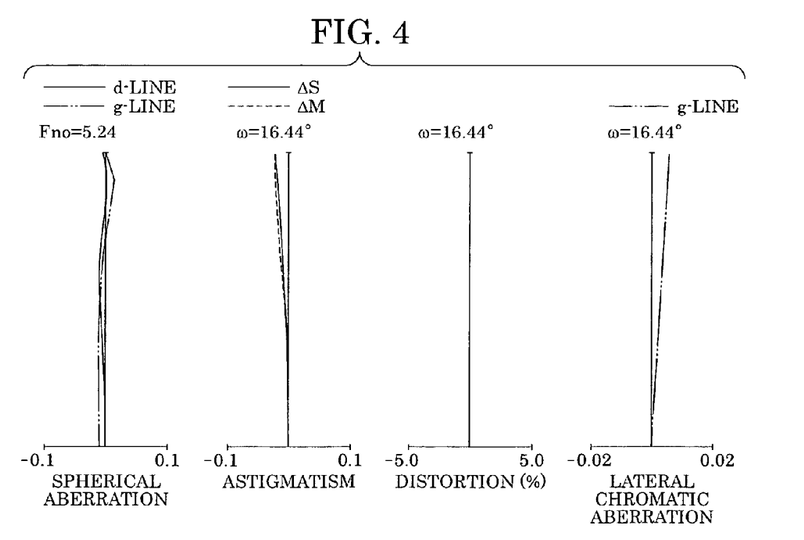
FIG. 4 illustrates an aberration diagram of the zoom lens of exemplary embodiment 1 at the telephoto end.

FIGS. 1A, 1B, and 1C illustrate lens sectional views of a zoom lens of exemplary embodiment 1 at the wide-angle end (short focal length end), the middle zoom position, and the telephoto end (long focal length end) respectively. FIGS. 2, 3, and 4 illustrate aberration diagrams of the zoom lens of exemplary embodiment 1 at the wide-angle end, the middle zoom position, and the telephoto end respectively. The zoom lens of exemplary embodiment 1 has a zoom ratio of about 1.91, and an F number of approximately 3.28 to 4.69. Note that other exemplary embodiments can have various zoom ratios and F numbers and any discussion herein is not intended to limit exemplary embodiments to the quantities stated.

Figure 5A:
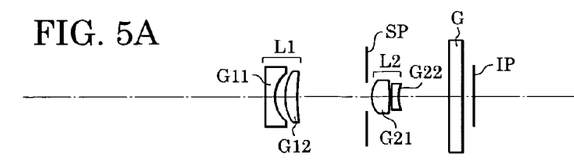
FIGS. 5A, 5B, and 5C illustrate lens sectional views of a zoom lens of exemplary embodiment 2.
Figure 5B:
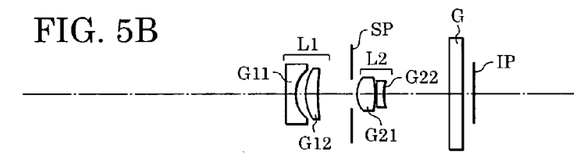
Figure 5C:
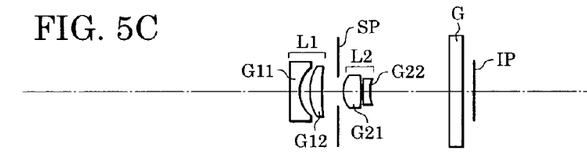
Figure 6:
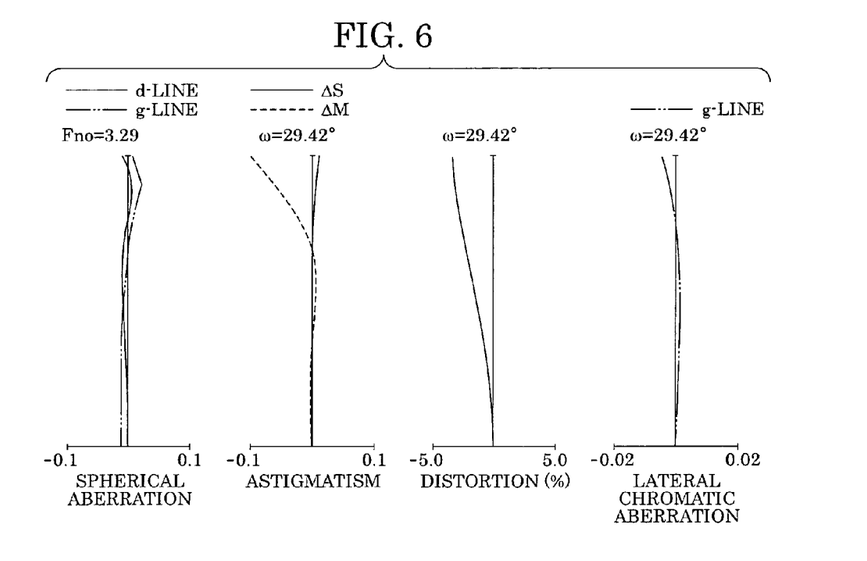
FIG. 6 illustrates an aberration diagram of the zoom lens of exemplary embodiment 2 at the wide-angle end.
Figure 7:
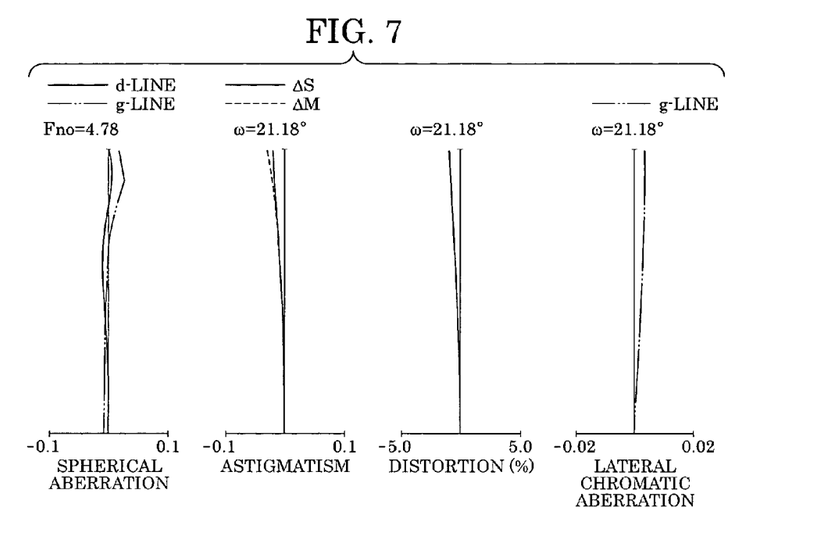
FIG. 7 illustrates an aberration diagram of the zoom lens of exemplary embodiment 2 at the middle focal length.
Figure 8:
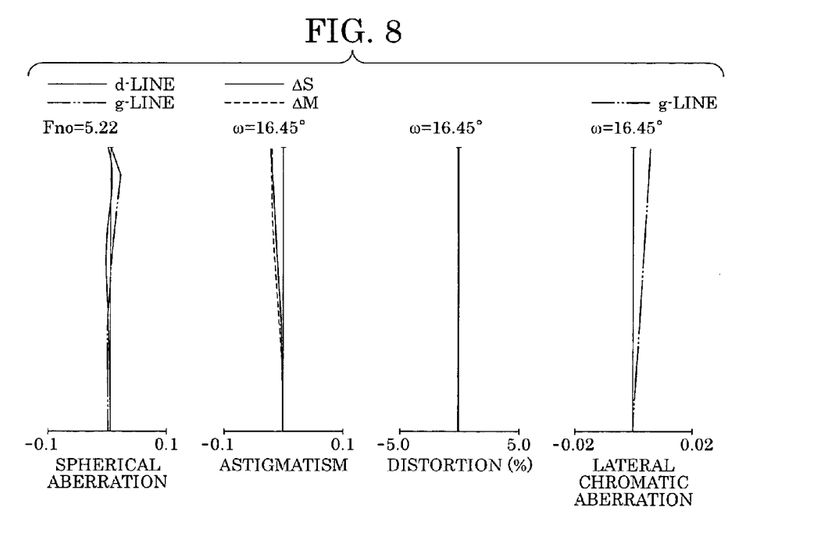
FIG. 8 illustrates an aberration diagram of the zoom lens of exemplary embodiment 2 at the telephoto end.

FIGS. 5A, 5B, and 5C illustrate lens sectional views of a zoom lens of exemplary embodiment 2 at the wide-angle end, the middle zoom position, and the telephoto end respectively. FIGS. 6, 7, and 8 illustrate aberration diagrams of the zoom lens of exemplary embodiment 2 at the wide-angle end, the middle zoom position, and the telephoto end respectively. The zoom lens of exemplary embodiment 2 has a zoom ratio of 1.91, and an F number of approximately 3.28 to 4.67.

Figure 9A:
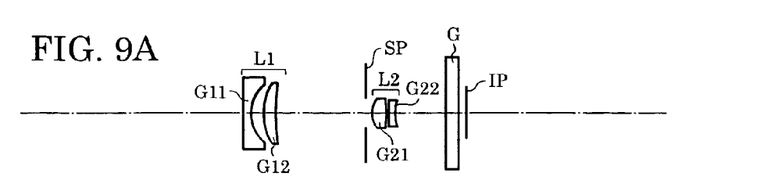
FIGS. 9A, 9B, and 9C illustrate lens sectional views of a zoom lens of exemplary embodiment 3.
Figure 9B:
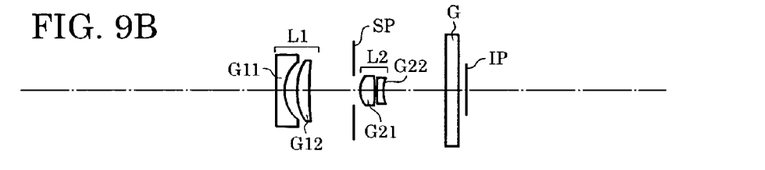
Figure 9C:
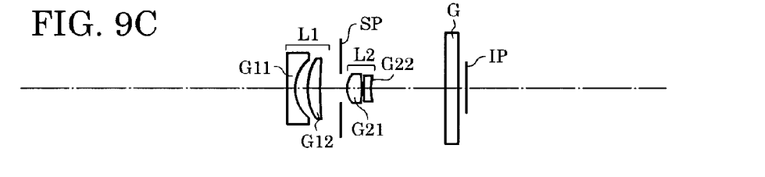
Figure 10:
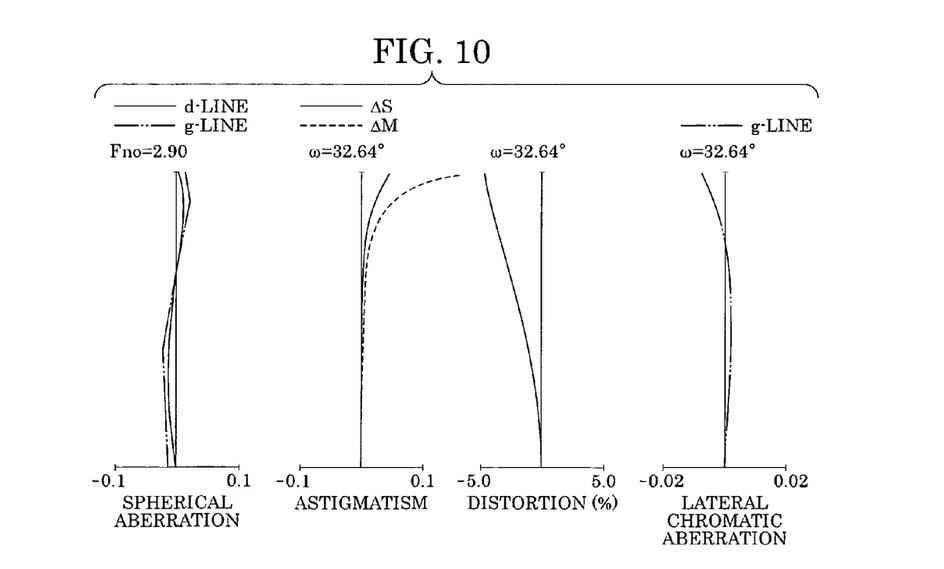
FIG. 10 illustrates an aberration diagram of the zoom lens of exemplary embodiment 3 at the wide-angle end.
Figure 11:
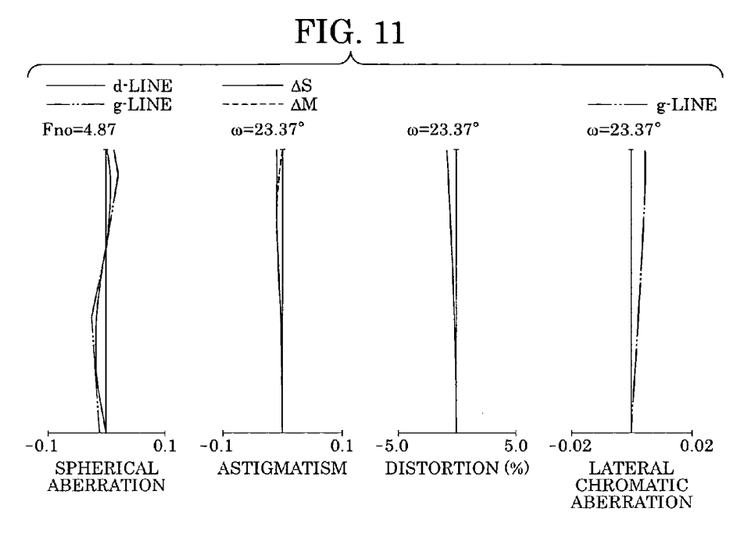
FIG. 11 illustrates an aberration diagram of the zoom lens of exemplary embodiment 3 at the middle focal length.
Figure 12:
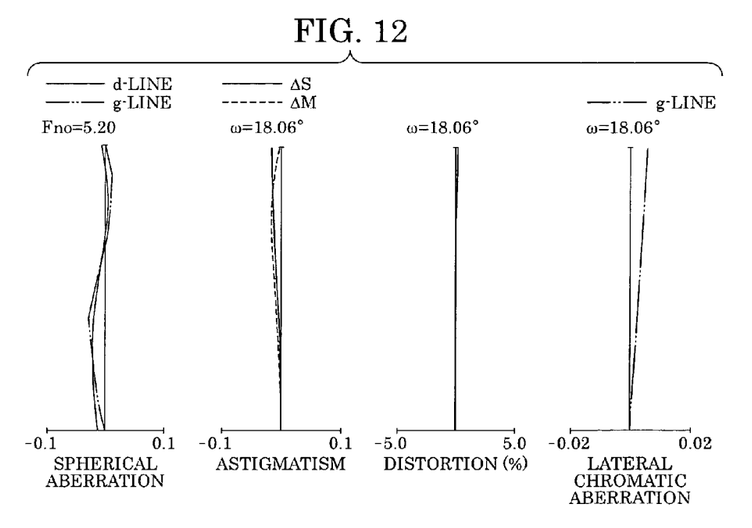
FIG. 12 illustrates an aberration diagram of the zoom lens of exemplary embodiment 3 at the telephoto end.

FIGS. 9A, 9B, and 9C illustrate lens sectional views of a zoom lens of exemplary embodiment 3 at the wide-angle end, the middle zoom position, and the telephoto end respectively. FIGS. 10, 11, and 12 illustrate aberration diagrams of the zoom lens of exemplary embodiment 3 at the wide-angle end, the middle zoom position, and the telephoto end respectively. The zoom lens of exemplary embodiment 3 has a zoom ratio of 1.96, and an F number of approximately 3.28 to 4.54.

Figure 13A:
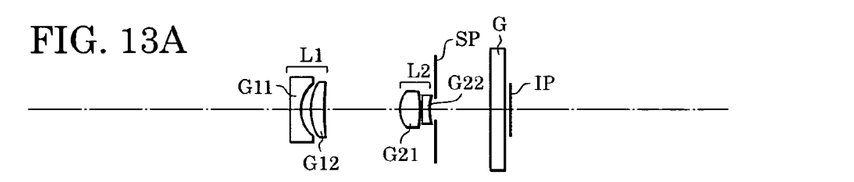
FIGS. 13A, 13B, and 13C illustrate lens sectional views of a zoom lens of exemplary embodiment 4.
Figure 13B:
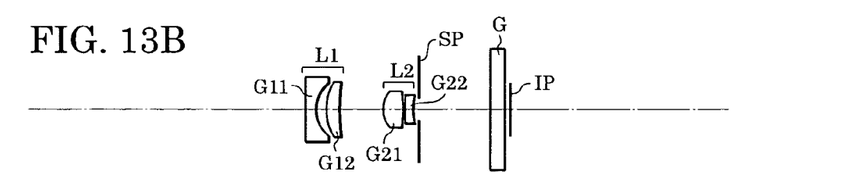
Figure 13C:
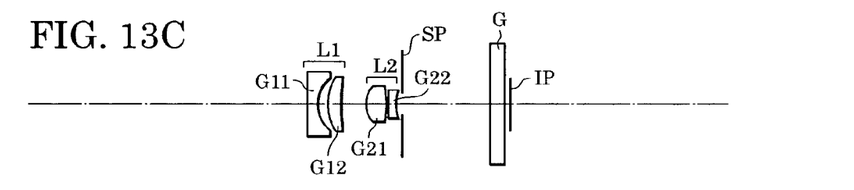
Figure 14:
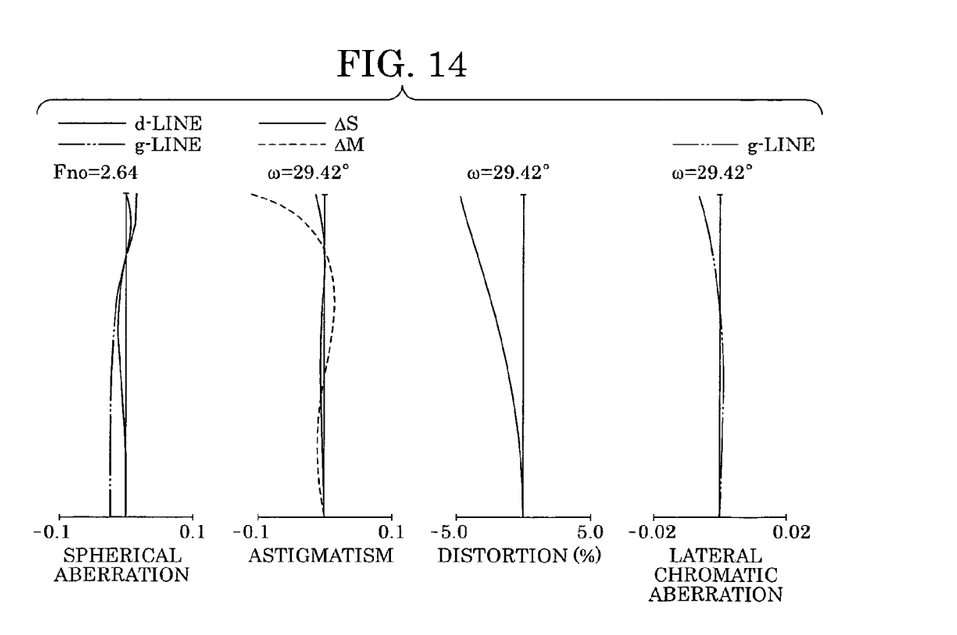
FIG. 14 illustrates an aberration diagram of the zoom lens of exemplary embodiment 4 at the wide-angle end.
Figure 15:
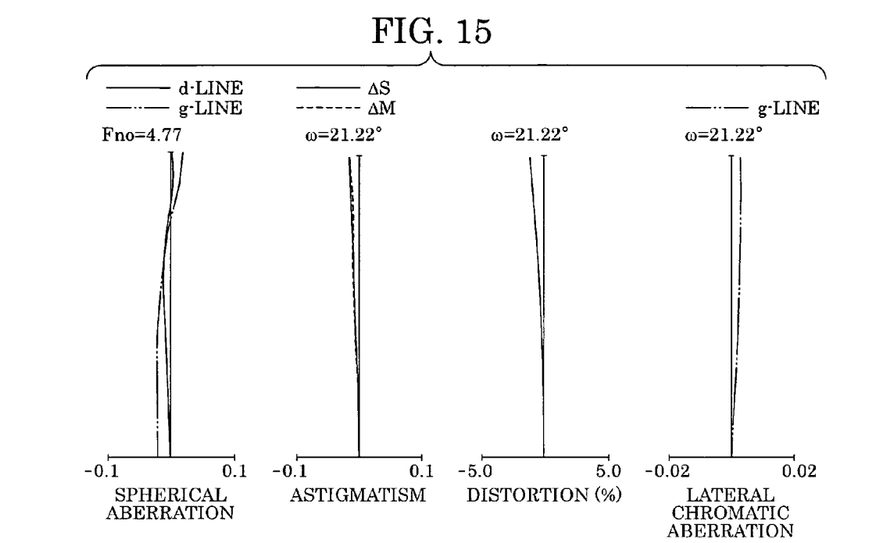
FIG. 15 illustrates an aberration diagram of the zoom lens of exemplary embodiment 4 at the middle focal length.
Figure 16:
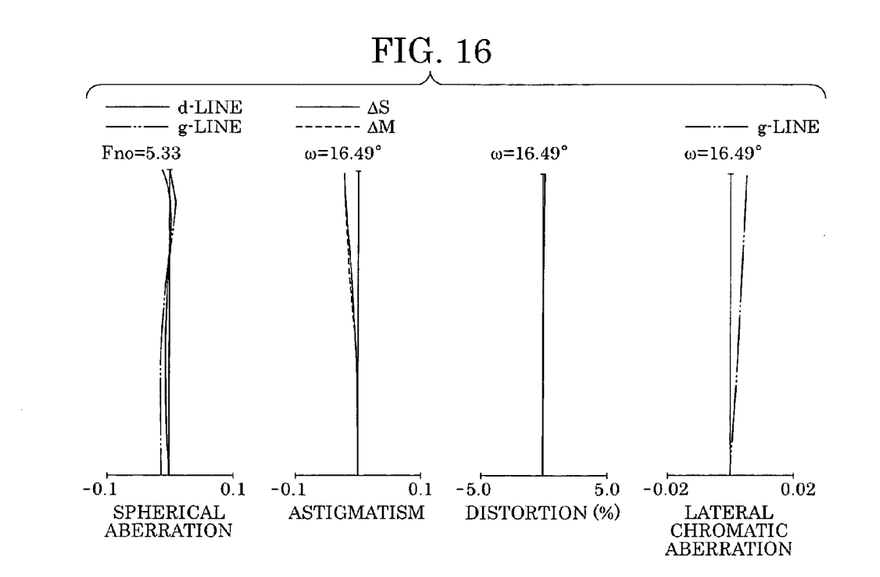
FIG. 16 illustrates an aberration diagram of the zoom lens of exemplary embodiment 4 at the telephoto end.

FIGS. 13A, 13B, and 13C illustrate lens sectional views of a zoom lens of exemplary embodiment 4 at the wide-angle end, the middle zoom position, and the telephoto end respectively. FIGS. 14, 15, and 16 illustrate aberration diagrams of the zoom lens of exemplary embodiment 4 at the wide-angle end, the middle zoom position, and the telephoto end respectively. The zoom lens of exemplary embodiment 4 has a zoom ratio of 1.91, and an F number of approximately 3.28 to 4.83.

Figure 17A:
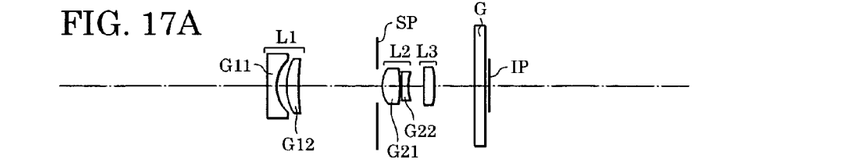
FIGS. 17A, 17B, and 17C illustrate lens sectional views of a zoom lens of exemplary embodiment 5.
Figure 17B:
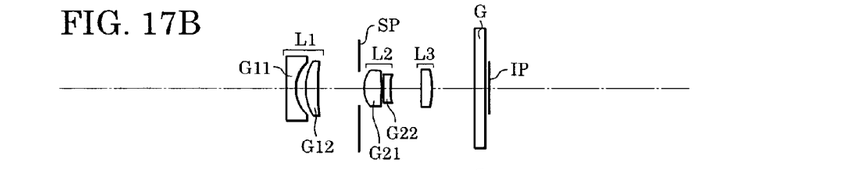
Figure 17C:
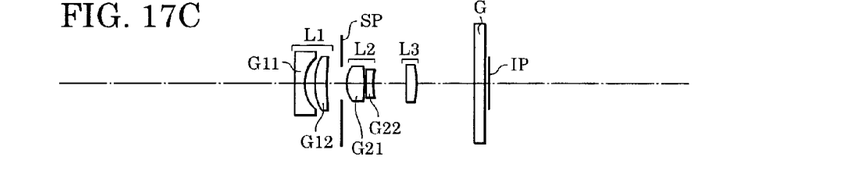
Figure 18:
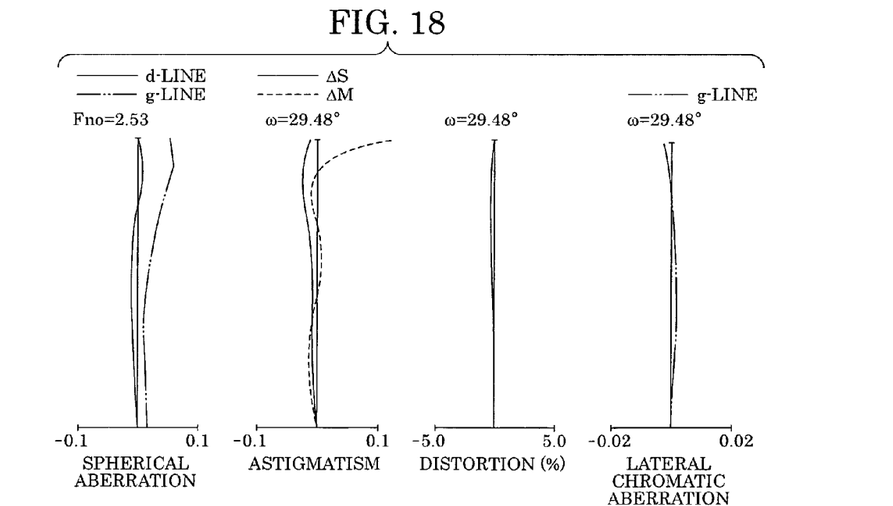
FIG. 18 illustrates an aberration diagram of the zoom lens of exemplary embodiment 5 at the wide-angle end.
Figure 19:
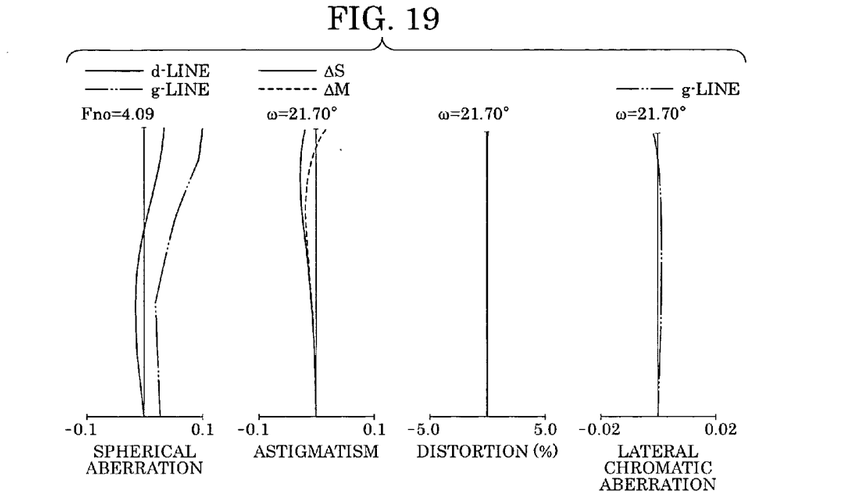
FIG. 19 illustrates an aberration diagram of the zoom lens of exemplary embodiment 5 at the middle focal length.
Figure 20:
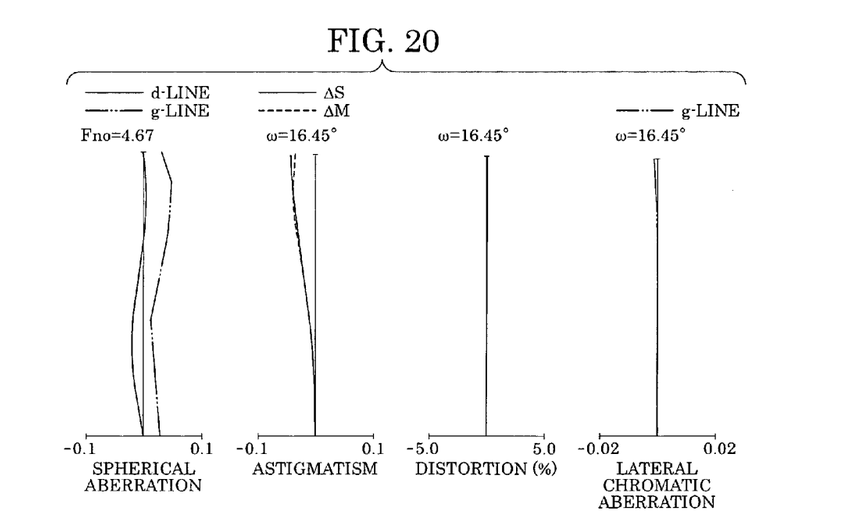
FIG. 20 illustrates an aberration diagram of the zoom lens of exemplary embodiment 5 at the telephoto end.

FIGS. 17A, 17B, and 17C illustrate lens sectional views of a zoom lens of exemplary embodiment 5 at the wide-angle end, the middle zoom position, and the telephoto end respectively. FIGS. 18, 19, and 20 illustrate aberration diagrams of the zoom lens of exemplary embodiment 5 at the wide-angle end, the middle zoom position, and the telephoto end respectively. The zoom lens of exemplary embodiment 5 has a zoom ratio of 1.91, and an F number of approximately 2.88 to 4.07.

Figure 21:
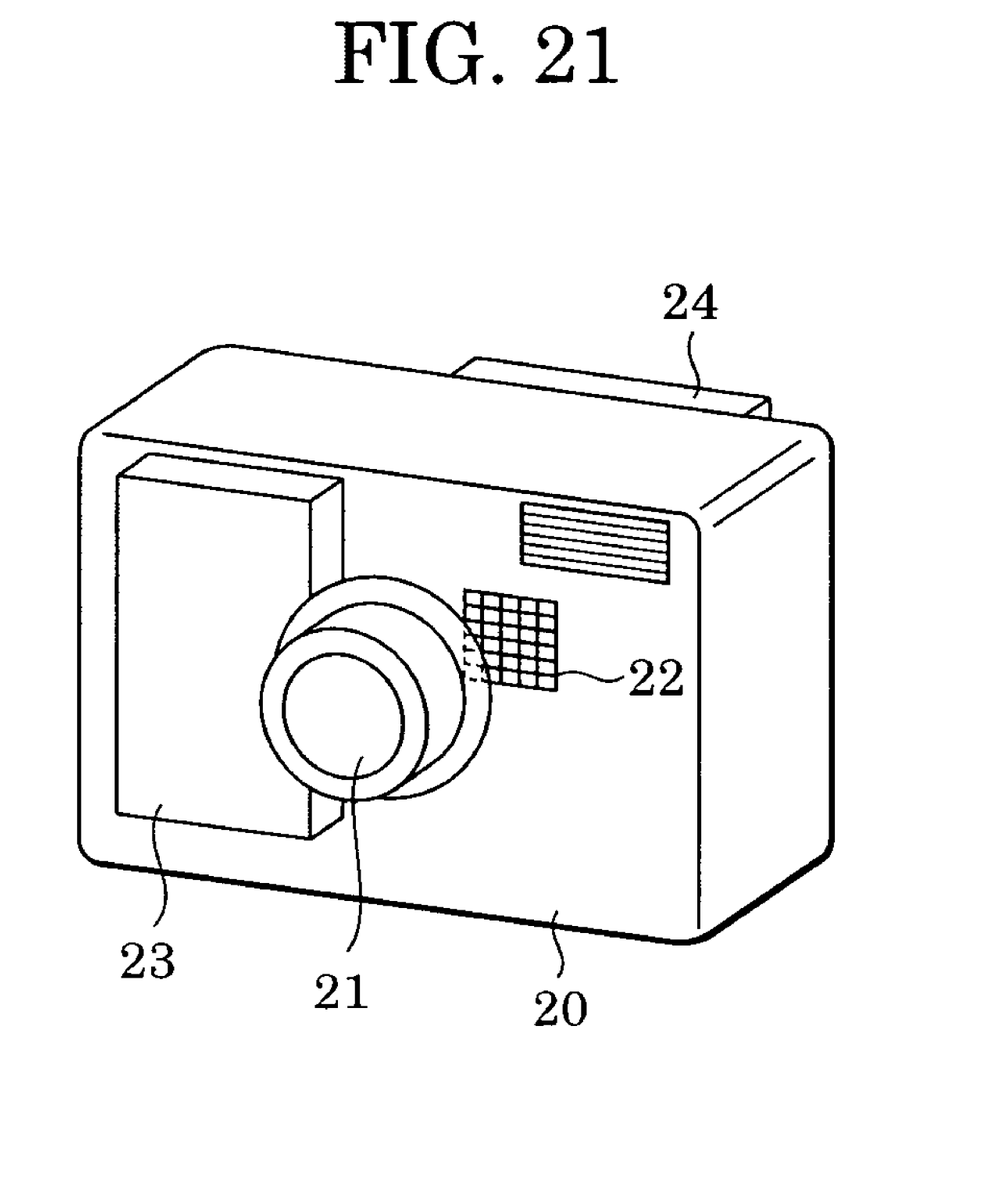
FIG. 21 illustrates a schematic view of a digital still camera.

FIG. 21 illustrates a schematic view of a digital still camera (image pickup apparatus) having a zoom lens system according to at least one exemplary embodiment.

The zoom lens of at least one exemplary embodiment can be a photographic lens system configured to be used in an image pickup apparatus. In each lens sectional view, the left side is the object side, and the right side is the image side.

In the lens sectional views of FIGS. 1A to 1C, 5A to 5C, 9A to 9C, 13A to 13C, and 17A to 17C, reference character L1 denotes a first lens unit having negative refractive power (optical power, which is the inverse of the focal length), reference character L2 denotes a second lens unit having positive refractive power, and reference character L3 denotes a third lens unit having positive refractive power. Reference character SP denotes an aperture stop, which is located on the object side of the second lens unit L2 in exemplary embodiments 1 (FIGS. 1A–1C), 2 (FIGS. 5A–5C), 3 (FIGS. 9A–9C), and 5 (FIGS. 17A–17C), and on the image side of the second lens unit L2 in exemplary embodiment 4 (FIGS. 13A–13C).

Reference character G denotes an optical block that is provided for design reasons and can correspond to an optical filter, a faceplate, a crystal low pass filter, or an infrared cut-off filter. Reference character IP denotes an image plane where a light-sensitive surface is placed. When the zoom lens is used, as a photographic optical system for a camcorder or a digital still camera, the light-sensitive surface corresponds to the imaging surface of a solid-state image sensor (photoelectric transducer) (e.g., a CCD sensor or a CMOS sensor).

In each aberration diagram, reference characters d and g denote the d line and the g line respectively, and reference characters $\Delta M$ and $\Delta S$ denote the meridional image surface and the sagittal image surface respectively. The lateral chromatic aberration (chromatic aberration of magnification) is shown by the g line.

In each embodiment, the wide-angle end and the telephoto end mean the zoom positions where the lens unit for variable magnification (e.g., second lens unit) is at either end of its mechanically movable range on the optical axis.

In the zoom lenses of exemplary embodiments 1 to 4 illustrated in FIGS. 1A to 1C, 5A to 5C, 9A to 9C, and 13A to 13C, when zooming from the wide-angle end to the telephoto end, the first lens unit L1 can move in a curve convex toward the image side, and the second lens unit L2 can move toward the object side.

In the zoom lens of exemplary embodiment 5 illustrated in FIGS. 17A to 17C, when zooming from the wide-angle end to the telephoto end, the first lens unit L1 can move in a curve convex toward the image side, the second lens unit L2 can move toward the object side such that the distance from the second lens unit L2 to the first lens unit L1 decreases, and the third lens unit L3 can move toward the object side such that the distance from the third lens unit L3 to the second lens unit L2 increases.

In at least one exemplary embodiment, the aperture stop SP can moves together with the second lens unit L2 when zooming.

In the zoom lens of at least one exemplary embodiment, magnification variation can be performed by moving the second lens unit L2, with the movement of the image plane accompanying the magnification variation compensated by moving the first lens unit L1.

In exemplary embodiments 1 to 4, the first lens unit L1 can be moved on the optical axis to focus. In exemplary embodiment 5, the third lens unit L3 can be moved on the optical axis to focus.

Focusing by the first lens unit L1 may be performed by using a locus as an extension of a cam locus for zooming formed in a staircase pattern.

In general, in order for a two-unit zoom lens and a three-unit zoom lens to have good optical performance throughout the entire zoom range, to reduce the number of lenses, and to reduce the thickness of the lens system, it is effective to use an aspherical surface in an appropriate part in the lens system.

In addition, it is appropriate to set the lens configuration of the second lens unit, which can travel a relatively long distance when zooming, and also set the lens configuration of the first lens unit, which can be configured to compensate the fluctuation of image plane due to magnification variation, so as to reduce the aberration fluctuation in zooming.

In at least one exemplary embodiment, the first lens unit L1 can include a first lens element G11 having negative refractive power and a second lens element G12 having positive refractive power. The first lens element G11 can have a meniscus shape, and its image side can be a concave aspherical surface. The second lens element G12 can have a meniscus shape, and its object side can be a convex surface.

The second lens element G12 can be formed of a material having an increased refractive index and an increased dispersion.

The second lens unit L2 can include a third lens element G21, which can have positive refractive power and a fourth lens element G22, which can have negative refractive power. The third lens element G21 can have a biconvex shape, and its object side can be an aspherical surface. The absolute value of the refractive power of the object-side surface can be greater than that of the image-side surface. The fourth lens element G22 can have a meniscus shape, and its image side can be a concave aspherical surface. The absolute value of the refractive power of the image-side surface can be greater than that of the object-side surface.

The third lens element G21 can be formed of a material having a reduced refractive index and a reduced dispersion, and the fourth lens element G22 can be formed of a material having an increased refractive index and an increased dispersion.

Thus, the axial chromatic aberration can be well compensated.

In exemplary embodiment 5, the third lens unit L3 can include a single lens element (fifth lens element) having positive refractive power.

At least one exemplary embodiment satisfies at least one of the following conditions. A different effect is obtained for each condition.

$$-0.6 < \frac{f11 \times f12}{(f1)^2} < -0.2 \tag{1}$$

$$7 < v11 - v12 < 15 \tag{2}$$

$$1.8 < N12 \tag{3}$$

$$26 < v12 \tag{4}$$

$$45 < v21 - v22 < 50 \tag{5}$$

-continued $$1.5 < \frac{R22a + R22b}{R22a - R22b} < 2.5 \tag{6}$$

$$-0.39 < Da/f1 < -0.3 \tag{7}$$

$$-2.4 < f1/fw < -1.5 \tag{8}$$

Here, f11 is the focal length of the first lens element G11, f12 is the focal length of the second lens element G12, f1 is the focal length of the first lens unit L1, fw is the focal length of the entire system at the wide-angle end, v11 is the Abbe number of the material constituting the first lens element G11, v12 is the Abbe number of the material constituting the second lens element G12, N12 is the refractive index of the material constituting the second lens element G12, v21 is the Abbe number of the material constituting the third lens element G21, v22 is the Abbe number of the material constituting the fourth lens element G22, R22a is the radius of curvature of the object-side surface of the fourth lens element G22, R22b is the radius of curvature of the image-side surface of the fourth lens element G22, and Da is the length on the optical axis from the most object-side surface to the most image-side surface (the distance between the surface vertexes) of the first lens unit L1.

In the above conditions, the Abbe numbers and the refractive indices are for the d line, where the d-line indicates the bright line spectrum of He atom. Abbe number vd is represented by the following formula:

$$vd=(Nd-1)/(NF-NC)$$

Nd is the refractive index of the material for the d line, NF is the refractive index of the material for the F line (refractive index for the wavelength hydrogen F (486.13 nm)), and NC is the refractive index of the material for the C line (refractive index of the material for the wavelength hydrogen C (656.27 nm)). Next, the technical meaning of each condition will be described.

Condition 1 relates to the focal lengths of the first lens element G11 and the second lens element G12 constituting the first lens unit L1. Condition 2 relates to the Abbe numbers of the materials constituting the first lens element G11 and the second lens element G12 constituting the first lens unit L1. In order to reduce the coma flare and improve chromatic aberration throughout the zoom range, at least one exemplary embodiment can satisfy both of conditions 1 and 2.

In order to appropriately strengthen the refractive powers of the two lenses constituting the first lens unit L1, and to maintain a balance of the chromatic aberration with the lenses having somewhat strong refractive powers, one may maintain the difference between the Abbe numbers of the materials of the two lenses constituting the first lens unit L1. Conditions for it are mathematically represented by conditions 1 and 2.

If the refractive powers of the lenses are too strong and f11×f12/(f1)² is above the upper limit of condition 1, it can be difficult to improve the oblique aberration in the wide-angle range. If the refractive powers of the lenses are too weak and f11×f12/(f1)² is below the lower limit of condition 1, the entire lens system may need to be large.

In a power arrangement in the range of condition 1, if v11–v12 is above the upper limit of condition 2 or below the lower limit of condition 2, it can be difficult to improve the lateral chromatic aberration in the entire lens system. If v11–v12 is above the upper limit of condition 2, one may weaken the refractive powers of the two lenses constituting the first lens unit L1 in order to maintain a balance of the lateral chromatic aberration. As a result, condition 1 is not satisfied, and the coma flare can increase throughout the entire zoom range. If v11–v12 is below the lower limit of condition 2, one may strengthen the refractive powers of the two lenses constituting the first lens unit L1, although it may be difficult to ensure the edge of the second lens element G12 in the first lens unit L1.

Condition 3 relates to the refractive index of the material constituting the second lens element G12 in the first lens unit L1. If the refractive index N12 is below the lower limit of condition 3, the diameters of the lenses in the first lens unit L1 may be large, and it can be difficult to reduce the coma flare in the wide-angle range.

Condition 4 relates to the Abbe number of the material constituting the second lens element G12 in the first lens unit L1. If the Abbe number v12 is below the lower limit of condition 4, it can be difficult to improve the lateral chromatic aberration in the lens system.

Condition 5 relates to the Abbe numbers of the materials constituting the third lens element and the fourth lens element in the second lens unit L2. If the difference between the Abbe numbers (v21–v22) is not appropriate, that is to say, it is above the upper limit of condition 5 or below the lower limit of condition 5, it can be difficult to improve the axial chromatic aberration (longitudinal chromatic aberration) in the telephoto range.

Condition 6 relates to the shape factor of the fourth lens element G22 in the second lens unit L2. If condition 6 is not satisfied, it can be difficult to reduce the coma flare in the periphery of the picture in the telephoto range.

Condition 7 relates to the sum of the thicknesses of lenses in the first lens unit L1 and the distance between the lenses. If Da/f1 is above the upper limit of condition 7, a large thickness of the first lens unit L1 can cause the most object-side lens to be large, and consequently can cause the lens system to be large.

If the thickness of the first lens unit L1 is small and Da/f1 is below the lower limit of condition 7, a lens holder disposed between the first lens element G11 and the second lens element G12 may need to be thin, possibly decreasing the strength of the lens holder.

Condition 8 relates to the focal length f1 of the first lens unit L1. If f1/fw is above the upper limit of condition 8, it can be difficult to improve the image plane curvature throughout the entire zoom range. If f1/fw is below the lower limit of condition 8, the total length of the zoom lens at the wide-angle end tends to be large.

In at least one exemplary embodiment, the numerical range of each condition can be as follows:

$$-0.5 < \frac{f11 \times f12}{(f1)^2} < -0.25 \quad (1a)$$

$$10 < v11 - v12 < 14 \quad (2a)$$

$$1.95 < N12 \quad (3a)$$

$$27 < v12 \quad (4a)$$

$$46 < v21 - v22 < 48 \quad (5a)$$

$$1.7 < \frac{R22a + R22b}{R22a - R22b} < 2.3 \quad (6a)$$

$$-0.38 < Da/f1 < -0.35 \quad (7a)$$

$$-2.2 < f1/fw < -1.7 \quad (8a)$$

In the above exemplary embodiments, on the object side of the first lens unit L1, between the lens units, or on the image side of the third lens unit L3, a filter or a lens unit having small refractive power may be added.

As described above, the lens configuration of each lens unit, the position of the aspherical surface in each lens unit, how each lens unit moves when zooming, and how focusing is performed can be optimized in each embodiment. Thus, although the number of lenses can be reduced so as to shorten the total length of the zoom lens, in at least one exemplary embodiment, the zoom lens has a zoom ratio of about 2×, is bright, has improved optical performance, and can be operatively connected to a digital still camera.

Next, an exemplary embodiment of a digital still camera (image pickup apparatus) configured to use a zoom lens system in accordance with exemplary embodiments as a photographic optical system, will be described with reference to FIG. 21. In FIG. 21, reference numeral 20 denotes a camera main body, reference numeral 21 denotes a photographic optical system which includes a zoom lens system in accordance exemplary embodiments, reference numeral 22 denotes a solid-state image sensor (photoelectric transducer) (e.g., a CCD sensor or a CMOS sensor) sensing an object image via the photographic optical system 21, reference numeral 23 denotes a memory for recording the object image sensed by the image sensor 22, and reference numeral 24 denotes a finder for observing the object image displayed on a display device (not shown, e.g., liquid crystal panel). The display device displays the object image formed on the image sensor 22.

As described above, a zoom lens system according to exemplary embodiments can be used for an image pickup apparatus (e.g., a digital still camera), thereby achieving an image pickup apparatus that is compact, and has an improved optical performance.

Next, numerical embodiments corresponding to the exemplary embodiments will be shown. In each numerical embodiment, i shows the order of surfaces from the object side, Ri shows the radius of curvature of the ith surface, Di shows the distance between the ith surface and the (i+1)th surface (the lens thickness or the air space), and Ni and vi show the refractive index and the Abbe number for the d line respectively.

The two most image-side surfaces are the two planes constituting the optical block G.

When a displacement in the direction of the optical axis at a height from the optical axis (h) referenced to the surface vertex is x, the aspherical shape is represented by the following formula:

$$x = (h^2/R) / [1 + \{1 - (1+k)(h/R)^2\}^{1/2}] + Ah^2 + Bh^4 + Ch^6 + Dh^8 + Eh^{10}$$

where k is the conic constant, A, B, C, D, and E are the aspherical coefficients, and R is the paraxial radius of curvature.

Incidentally, "e-0x" means "×10$^{-x}$". Reference character f denotes the focal length, reference character Fno denotes the F-number, and reference character ω denotes the half angle of view.

Table 1 shows the relation between the conditions 1 to 8 and exemplary embodiments 1 to 5.

TABLE 1

Numerical Embodiment 1 f = 5.94~11.35　　　F n o = 3.28~4.89　　　2 ω = 58.9°~32.9°

| | | |
|---|---|---|
| R 1 = 1485.941 | D 1 = 1.20 | N 1 = 1.853000　　ν 1 = 41.0 |
| ‡R 2 = 3.985 | D 2 = 1.35 | |
| R 3 = 7.659 | D 3 = 1.50 | N 2 = 2.003300　　ν 2 = 28.3 |
| R 4 = 28.455 | D 4 = variable | |
| R 5 = stop | D 5 = 0.70 | |
| ‡R 6 = 3.144 | D 6 = 2.30 | N 3 = 1.487490　　ν 3 = 70.2 |
| R 7 = −11.141 | D 7 = 0.20 | |
| R 8 = 7.659 | D 8 = 0.90 | N 4 = 1.821140　　ν 4 = 24.1 |
| ‡R 9 = 5.126 | D 9 = variable | |
| R10 = ∞ | D10 = 1.70 | N 5 = 1.516330　　ν 5 = 64.1 |
| R11 = ∞ | | |

| variable | focal length | | |
|---|---|---|---|
| distance | 5.94 | 8.84 | 11.35 |
| D 4 | 9.03 | 4.42 | 2.01 |
| D 9 | 8.54 | 8.50 | 10.47 | aspherical coefficients
the second surface:　k = −1.31694e+00　A = 0　B = 1.26356e−03　C = −1.33251e−05　D = 9.89703e−07
　　　　　　　　　　E = −5.48350e−08
the sixth surface:　　k = 8.45422e−02　A = 0　B = −1.85980e−03　C = −1.58512e−04　D = −1.71224e−05
　　　　　　　　　　E = −2.67740e−06
the ninth surface:　　k = 0.00000e+00　A = 0　B = 5.70428e−03　C = 8.95465e−04　D = −7.25511e−05
　　　　　　　　　　E = 4.11746e−05

Numerical Embodiment 2 f = 5.94~11.35　　　F n o = 3.28~4.67　　　2 ω = 58.8°~32.9°

| | | |
|---|---|---|
| ‡R 1 = 18680.714 | D 1 = 1.20 | N 1 = 1.853000　　ν 1 = 41.0 |
| ‡R 2 = 4.042 | D 2 = 1.38 | |
| R 3 = 7.790 | D 3 = 1.50 | N 2 = 2.003300　　ν 2 = 28.3 |
| R 4 = 28.543 | D 4 = variable | |
| R 5 = stop | D 5 = 0.70 | |
| ‡R 6 = 3.170 | D 6 = 2.30 | N 3 = 1.487490　　ν 3 = 70.2 |
| R 7 = −10.493 | D 7 = 0.20 | |
| R 8 = 15.940 | D 8 = 0.90 | N 4 = 1.821140　　ν 4 = 24.1 |
| ‡R 9 = 4.998 | D 9 = variable | |
| R10 = ∞ | D10 = 1.70 | N 5 = 1.516330　　ν 5 = 64.1 |
| R11 = ∞ | | |

| variable | focal length | | |
|---|---|---|---|
| distance | 5.94 | 8.64 | 11.35 |
| D 4 | 8.91 | 4.32 | 1.92 |
| D 9 | 6.52 | 8.48 | 10.44 | aspherical coefficients
the first surface:　　k = 0.00000e+00　A = 0　B = −1.16075e−04　C = −1.31719e−05　D = 4.37375e−07
　　　　　　　　　　E = −2.27261e−08
the second surface:　k = −1.55719e+00　A = 0　B = 1.49820e−03　C = −1.30424e−06　D = 2.65594e−06
　　　　　　　　　　E = −3.80598e−08
the sixth surface:　　k = 6.00511e−02　A = 0　B = −1.76476e−03　C = −1.75043e−04　D = −1.71802e−05
　　　　　　　　　　E = −1.78575e−06
the ninth surface:　　k = 0.00000e+00　A = 0　B = 5.77051e−03　C = 7.38238e−04　D = −7.80197e−05
　　　　　　　　　　E = 4.77716e−05

Numerical Embodiment 3 f = 5.23~10.27　　　F n o = 3.28~4.54　　　2 ω = 65.3°~36.1°

| | | |
|---|---|---|
| R 1 = 103.360 | D 1 = 1.20 | N 1 = 1.883000　　ν 1 = 40.8 |
| ‡R 2 = 4.315 | D 2 = 1.54 | |
| R 3 = 8.245 | D 3 = 1.70 | N 2 = 2.003300　　ν 2 = 28.3 |
| R 4 = 28.462 | D 4 = variable | |
| R 5 = stop | D 5 = 0.70 | |
| ‡R 6 = 3.007 | D 6 = 2.00 | N 3 = 1.487490　　ν 3 = 70.2 |
| R 7 = −13.577 | D 7 = 0.20 | |
| R 8 = 9.570 | D 8 = 0.90 | N 4 = 1.833100　　ν 4 = 23.9 |
| ‡R 9 = 3.953 | D 9 = variable | |
| R10 = ∞ | D10 = 1.70 | N 5 = 1.516330　　ν 5 = 64.1 |
| R11 = ∞ | | |

TABLE 1-continued

| variable | focal length | | |
|---|---|---|---|
| distance | 5.23 | 7.75 | 10.27 |
| D 4 | 11.62 | 5.68 | 2.66 |
| D 9 | 6.50 | 8.20 | 9.91 | aspherical coefficients
the second surface: k = −1.42183e+00  A = 0  B = 1.22963e−03  C = −1.38362e−05  D = 8.22067e−07
E = −3.20806e−08
the sixth surface: k = −2.00276e−01  A = 0  B = −6.21510e−04  C = −1.47997e−04  D = −7.56472e−06
E = −5.53040e−08
the ninth surface: k = 0.00000e+00  A = 0  B = 6.16462e−03  C = 1.58649e−03  D = −5.78920e−04
E = 1.92409e−04

Numerical Embodiment 4 f = 5.94~11.32            F n o = 3.28~4.83            2 ω = 58.8°~33.0°
‡R 1 = 89.080    D 1 = 1.20        N 1 = 1.853000    ν 1 = 41.0
‡R 2 = 3.651     D 2 = 1.15
 R 3 = 6.979     D 3 = 1.50        N 2 = 2.003300    ν 2 = 28.3
 R 4 = 22.911    D 4 = variable
‡R 5 = 3.146     D 5 = 2.30        N 3 = 1.487490    ν 3 = 70.2
 R 6 = −11.076   D 6 = 0.20
 R 7 = 16.212    D 7 = 0.90        N 4 = 1.821140    ν 4 = 24.1
‡R 8 = 5.301     D 8 = 0.70
 R 9 = stop      D 9 = variable
 R10 = ∞         D10 = 1.70        N 5 = 1.516330    ν 5 = 64.1
 R11 = ∞

| variable | focal length | | |
|---|---|---|---|
| distance | 5.94 | 8.63 | 11.32 |
| D 4 | 9.14 | 5.07 | 2.94 |
| D 9 | 6.65 | 8.70 | 10.74 | aspherical coefficients
the first surface: k = 0.00000e+00  A = 0  B = −6.99815e−04  C = 3.31019e−05  D = 1.19270e−07
E = −2.19817e−08
the second surface: k = −1.41927e+00  A = 0  B = 9.25720e−04  C = 1.75034e−05  D = 3.38793e−06
E = −9.40198e−08
the fifth surface: k = 8.87634e−02  A = 0  B = −2.01494e−03  C = −1.26022e−04  D = −1.92779e−05
E = −3.12432e−06
the eighth surface: k = 0.00000e+00  A = 0  B = 5.41271e−03  C = 9.93942e−04  D = −4.76768e−05
E = 1.79266e−05

Numerical Embodiment 5 f = 5.93~11.35            F n o = 2.88~4.07            2 ω = 59.0°~32.9°
 R 1 = 85.653    D 1 = 1.20        N 1 = 1.850000    ν 1 = 40.1
* R 2 = 3.885    D 2 = 1.45
 R 3 = 8.129     D 3 = 1.50        N 2 = 2.003300    ν 2 = 28.3
 R 4 = 40.496    D 4 = variable
 R 5 = stop      D 5 = 0.70
* R 6 = 3.289    D 6 = 2.30        N 3 = 1.487490    ν 3 = 70.2
 R 7 = −13.772   D 7 = 0.20
 R 8 = 14.240    D 8 = 0.90        N 4 = 1.833100    ν 4 = 23.9
* R 9 = 4.634    D 9 = variable
 R10 = 145.438   D10 = 1.30        N 5 = 1.487490    ν 5 = 70.2
 R11 = −17.455   D11 = variable
 R12 = ∞         D12 = 1.50        N 6 = 1.516330    ν 6 = 64.1
 R13 = ∞

| variable | focal length | | |
|---|---|---|---|
| distance | 5.93 | 8.42 | 11.35 |
| D 4 | 10.05 | 5.26 | 1.87 |
| D 9 | 2.25 | 4.18 | 4.62 |
| D11 | 5.32 | 5.69 | 7.55 | aspherical coefficients
the second surface: k = −2.09577e+00  A = 0  B = 2.70515e−03  C = −7.40449e−05  D = 2.20971e−06
E = −4.78643e−08
the sixth surface: k = −2.99310e−01  A = 0  B = −4.08483e−04  C = 4.81758e−05  D = −1.81425e−05
E = 7.96952e−07
the ninth surface: k = 0.00000e+00  A = 0  B = 3.98465e−03  C = 1.15012e−03  D = −2.53510e−04
E = 5.47141e−05

|  | Condition | Embodiment | | | | |
| --- | --- | --- | --- | --- | --- | --- |
|  |  | 1 | 2 | 3 | 4 | 5 |
| (1) | $\frac{f11 + f12}{f1^2}$ | −0.39 | −0.41 | −0.40 | −0.42 | −0.31 |
| (2) | v11 | 41.0 | 41.0 | 40.8 | 41.0 | 40.1 |
|  | v12 | 28.3 | 28.3 | 28.3 | 28.3 | 28.3 |
|  | v11 − v12 | 12.7 | 12.7 | 12.5 | 12.7 | 11.8 |
| (3) | N 12 | 2.0033 | 2.0033 | 2.0033 | 2.0033 | 2.0033 |
| (4) | v12 | 28.3 | 28.3 | 28.3 | 28.3 | 28.3 |
| (5) | v21 | 70.2 | 70.2 | 70.2 | 70.2 | 70.2 |
|  | v22 | 24.1 | 24.1 | 23.9 | 24.1 | 23.9 |
|  | v21 − v21 | 46.17 | 46.17 | 46.33 | 46.17 | 46.33 |
| (6) | R22a | 16.847 | 15.940 | 9.570 | 16.212 | 14.240 |
|  | R22b | 5.126 | 4.998 | 3.953 | 5.301 | 4.634 |
|  | $\frac{R22a + R22b}{R22a - R22b}$ | 1.9 | 1.9 | 2.4 | 2.06 | 1.96 |
| (7) | Da | 4.05 | 4.1 | 4.44 | 3.85 | 4.15 |
|  | f1 | −10.94 | −11.1 | −12 | −10.1 | −12.2 |
|  | Da/f1 | −0.37 | −0.37 | −0.37 | −0.38 | −0.34 |
| (8) | f1 | −10.94 | −11.1 | −12 | −10.1 | −12.2 |
|  | fw | 5.94 | 5.94 | 5.23 | 5.94 | 5.93 |
|  | f1/fw | −1.85 | −1.85 | −2.27 | −1.70 | −2.09 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-203857 filed Jul. 9, 2004, which is hereby incorporated by reference herein in its entirety.

What is claimed is:

1. A zoom lens system comprising from the object side to the image side:
   a first lens unit having negative optical power, the first lens unit consisting of a first lens element having negative optical power and a second lens element having positive optical power; and
   a second lens unit having positive optical power,
   wherein the distance between the first lens unit and the second lens unit changes during zooming, and
   wherein a focal length of the first lens unit (f1), a focal length of the first lens element (f11), a focal length of the second lens element (f12), an Abbe number of a material constituting the first lens element (v11), and an Abbe number of a material constituting the second lens element (v12) satisfy the following condition:

$$-0.6 < \frac{f11 \times f12}{(f1)^2} < -0.2$$

$$7 < v11 - v12 < 15,$$

wherein a refractive index (N12) and an Abbe number (v12) of a material constituting the second lens element satisfy the following conditions:

1.9<N12

26<[12.

2. The zoom lens system according to claim 1, wherein the second lens unit includes a third lens element having positive optical power and a fourth lens element having negative optical power.

3. The zoom lens system according to claim 2, wherein an Abbe number of a material constituting the third lens element (v21) and an Abbe number of a material constituting the fourth lens element (v22) satisfy the following condition:

45<v21−v22<50.

4. The zoom lens system according to claim 2, wherein a radius of curvature of the object-side surface of the fourth lens element (R22a) and a radius of curvature of the image-side surface of the fourth lens element (R22b) satisfy the following condition:

$$1.5 < \frac{R22a + R22b}{R22a - R22b} < 2.5$$

5. The zoom lens system according to claim 1, wherein the first lens element has a shape in which the absolute value of optical power of the image-side surface is greater than that of the object-side surface, and the second lens element has a meniscus shape in which the object side is convex.

6. The zoom lens system according to claim 1, further comprising an aperture stop disposed on one of the object side and the image side of the second lens unit.

7. The zoom lens system according to claim 1, wherein a length from the most object-side surface to the most image-side surface of the first lens unit (Da) and a focal length of the first lens unit (f1) satisfy the following condition:

−0.39<Da/f1<−0.3.

8. The zoom lens system according to claim 1, wherein a focal length of the first lens unit (f1) and a focal length of the system at the wide-angle end (fw) satisfy the following condition:

−2.4<f1/fw<−1.5.

9. The zoom lens system according to claim 1, wherein the zoom lens system forms an image on a solid-state image sensor.

10. An image pickup apparatus comprising:
    the zoom lens system according to claim 1; and
    a solid-state image sensor, wherein the image sensor senses an image formed by the zoom lens system.

11. A zoom lens system comprising from the object side to the image side:
    a first lens unit having negative optical power, the first lens unit consisting of a first lens element having negative optical power and a second lens element having positive optical power; and
    a second lens unit having positive optical power,
    wherein the distance between the first lens unit and the second lens unit changes during zooming, and
    wherein a refractive index (N12) and an Abbe number (v12) of a material constituting the second lens element satisfy the following conditions:

1.9<N12

26 <v12.

12. The zoom lens system according to claim 11, wherein the second lens unit includes a third lens element having positive optical power and a fourth lens element having negative optical power.

13. The zoom lens system according to claim 12, wherein an Abbe number of a material constituting the third lens element (ν21) and an Abbe number of a material constituting the fourth lens element (ν22) satisfy the following condition:

$$45 < \nu 21 - \nu 22 < 50.$$

14. The zoom lens system according to claim 12, wherein a radius of curvature of the object-side surface of the fourth lens element (R22a) and a radius of curvature of the image-side surface of the fourth lens element (R22b) satisfy the following condition:

$$1.5 < \frac{R22a + R22b}{R22a - R22b} < 2.5$$

15. The zoom lens system according to claim 11, wherein the first lens element has a shape in which the absolute value of optical power of the image-side surface is greater than that of the object-side surface, and the second lens element has a meniscus shape in which the object side is convex.

16. The zoom lens system according to claim 11, further comprising an aperture stop disposed on one of the object side and the image side of the second lens unit.

17. The zoom lens system according to claim 11, wherein a length from the most object-side surface to the most image-side surface of the first lens unit (Da) and a focal length of the first lens unit (f1) satisfy the following condition:

$$-0.39 < Da/f1 < -0.3.$$

18. The zoom lens system according to claim 11, wherein a focal length of the first lens unit (f1) and a focal length of the system at the wide-angle end (fw) satisfy the following condition:

$$-2.4 < f1/fw < 1.5.$$

19. The zoom lens system according to claim 11, wherein the zoom lens system forms an image on a solid-state image sensor.

20. An image pickup apparatus comprising:
   the zoom lens system according to claim 11; and
   a solid-state image sensor, wherein the image sensor senses an image formed by the zoom lens system.

* * * * *